(12) United States Patent
Irving et al.

(10) Patent No.: US 7,844,947 B2
(45) Date of Patent: Nov. 30, 2010

(54) RUNTIME SERVICES FOR NETWORK SOFTWARE PLATFORM

(75) Inventors: Richard H. Irving, Redmond, WA (US); David J. Messner, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1327 days.

(21) Appl. No.: 11/275,857

(22) Filed: Feb. 13, 2006

(65) Prior Publication Data

US 2006/0112370 A1 May 25, 2006

Related U.S. Application Data

(62) Division of application No. 10/262,326, filed on Sep. 30, 2002, now Pat. No. 7,114,148.

(51) Int. Cl.
*G06F 9/44* (2006.01)
(52) U.S. Cl. .................. 717/120; 717/107; 717/102; 707/690; 707/758
(58) Field of Classification Search .............. 717/108, 717/116, 120, 124, 126; 719/315, 316
See application file for complete search history.

(56) References Cited

U.S. PATENT DOCUMENTS

| | | | | |
|---|---|---|---|---|
| 5,953,524 | A * | 9/1999 | Meng et al. ................. | 717/108 |
| 5,958,013 | A * | 9/1999 | King et al. .................. | 709/227 |
| 6,226,788 | B1 | 5/2001 | Schoening et al. | |
| 6,341,314 | B1 | 1/2002 | Doganata et al. | |
| 6,404,445 | B1 * | 6/2002 | Galea et al. ................. | 715/853 |
| 6,442,748 | B1 | 8/2002 | Bowman-Amuah | |
| 6,550,057 | B1 | 4/2003 | Bowman-Amuah | |
| 6,598,141 | B1 | 7/2003 | Dussud et al. | |
| 6,601,233 | B1 | 7/2003 | Underwood | |
| 6,601,234 | B1 | 7/2003 | Bowman-Amuah | |
| 6,718,535 | B1 * | 4/2004 | Underwood ................. | 717/101 |
| 6,754,884 | B1 | 6/2004 | Lucas et al. | |
| 6,789,251 | B1 | 9/2004 | Johnson | |
| 6,792,605 | B1 | 9/2004 | Roberts et al. | |
| 6,883,172 | B1 | 4/2005 | Angeline et al. | |
| 6,910,068 | B2 | 6/2005 | Zintel et al. | |
| 6,922,685 | B2 | 7/2005 | Greene et al. | |
| 6,931,623 | B2 | 8/2005 | Vermeire et al. | |
| 6,959,307 | B2 | 10/2005 | Apte | |
| 6,980,997 | B1 | 12/2005 | Peschel-Gallee et al. | |
| 7,082,465 | B1 * | 7/2006 | Martin et al. ............... | 709/224 |
| 7,100,195 | B1 * | 8/2006 | Underwood .................. | 726/2 |

(Continued)

OTHER PUBLICATIONS

Title:The application of deductive databases to inter-module code analysis, author: Dietrich et al, dated: Oct. 17, 1991, source: IEEE.*

(Continued)

*Primary Examiner*—Chameli C Das
(74) *Attorney, Agent, or Firm*—Lee & Hayes, PLLC

(57) ABSTRACT

Runtime services for network software platforms are described. In one implementation, runtime services are configured for a web application. A configuration file is created containing tags that provide references to configuration information specific to operational behavior of the web application. The configuration file is read upon receiving a request to start the web application. The runtime services for the web application are initialized based on the configuration information read from the configuration file.

11 Claims, 9 Drawing Sheets

U.S. PATENT DOCUMENTS

| | | | |
|---|---|---|---|
| 7,103,873 B2 | 9/2006 | Tanner et al. | |
| 7,117,447 B2* | 10/2006 | Cobb et al. | 715/762 |
| 7,123,608 B1* | 10/2006 | Scott et al. | 370/353 |
| 7,127,713 B2* | 10/2006 | Davis et al. | 717/177 |
| 7,137,100 B2* | 11/2006 | Iborra et al. | 717/106 |
| 7,191,453 B2 | 3/2007 | Srinivasan et al. | |
| 7,206,827 B2* | 4/2007 | Viswanath et al. | 709/220 |
| 7,281,248 B2 | 10/2007 | Demsey et al. | |
| 7,293,262 B2* | 11/2007 | Sengodan | 717/136 |
| 7,526,771 B2* | 4/2009 | Roman et al. | 719/316 |
| 7,548,946 B1 | 6/2009 | Saulpaugh et al. | |
| 7,574,692 B2* | 8/2009 | Herscu | 717/116 |
| 7,665,064 B2* | 2/2010 | Able et al. | 717/117 |
| 2002/0062475 A1* | 5/2002 | Iborra et al. | 717/108 |
| 2002/0069400 A1 | 6/2002 | Miloushev et al. | |
| 2002/0073396 A1 | 6/2002 | Crupi et al. | |
| 2003/0030671 A1* | 2/2003 | Cobb et al. | 345/764 |
| 2003/0058277 A1 | 3/2003 | Bowman-Amuah | |
| 2003/0110467 A1* | 6/2003 | Balakrishnan | 717/104 |
| 2004/0015946 A1* | 1/2004 | Te'eni et al. | 717/169 |
| 2004/0133445 A1 | 7/2004 | Rajan et al. | |
| 2004/0226001 A1 | 11/2004 | Teegan et al. | |
| 2004/0237092 A1 | 11/2004 | Jairath | |
| 2005/0071810 A1 | 3/2005 | Sutter et al. | |
| 2006/0004699 A1* | 1/2006 | Lehikoinen et al. | 707/2 |
| 2010/0174724 A1* | 7/2010 | Wallace et al. | 707/749 |

OTHER PUBLICATIONS

Title: Modeling correlation in software recovery blocks, author: Tomek et al, source: IEEE, dated: Aug. 6, 2002.*

* cited by examiner

RUNTIME SERVICES FOR NETWORK SOFTWARE PLATFORM

CROSS-REFERENCE TO RELATED APPLICATIONS

This application is a divisional of U.S. patent application Ser. No. 10/262,326, filed on 30 Sep. 2002, entitled "Runtime Services for Network Software Platform", now U.S. Pat No. 7,114,148 (hereinafter, the "parent application"). The benefit of the filing date of the parent application is hereby claimed to fullest extent permitted by 35 U.S.C. §120. Additionally, because this divisional application is filed to prosecute claims that were withdrawn pursuant to a restriction/election requirement asserted in the parent application, the full benefit of 35 U.S.C. §121 is also claimed. Finally, the contents of the parent application are incorporated by this reference as if set forth verbatim herein.

TECHNICAL FIELD

This invention relates to network software, such as Web applications, and computer software development of such network software.

BACKGROUND

Microsoft Corporation has developed a network software platform known as the ".Net" platform (read as "Dot Net"). The platform allows developers to create Web services and applications that will execute over the Internet. The .Net platform is a software platform for Web services and Web applications implemented in a distributed computing environment. It represents the next generation of Internet computing, using open communication standards to communicate among loosely coupled Web services that are collaborating to perform a particular task. Active Server Pages (ASP) has long been the foundation for creating rich and dynamic Web sites using server-side scripting. Through the use of the NET platform, ASP has evolved into "ASP.NET," which is a set of technologies in the Microsoft .NET Framework for building Web applications and Web Services.

One of the challenges facing developers using the aforementioned technology as well as related Web site development and server software is the amount of code that needs to be written by developers in order to create objects in applications running on Web servers. Currently, a large amount of code is needed to create objects and "glue" them together, which is time consuming for developers to create and subject to errors.

Another challenge facing developers is figuring out interrelationships between programmable systems. For instance, what happens if an object is removed from an application? Will it cause the Web site to crash? Determining accurate interrelationships between many different systems can be an extremely difficult for custom developers of Web sites.

Memory is another issue facing developers of applications running on the Web. Memory is limited, and therefore, the developer typically writes code to ensure that objects are freed from memory. However, with the open nature of many network software platforms, many times the data structures used for particular objects and the code associated with such structures are incompatible. Thus, there may be a failure to recognize when an object is no longer being used by an application, because the object isn't managed by the particular platform it is running-on. As a result, many objects can continue to use memory resources beyond a period of time when they should have been removed from memory.

SUMMARY

Runtime services for network software platforms are described. In one implementation, runtime services are configured for a web application. A configuration file is created containing tags that provide references to configuration information specific to operational behavior of the web application. The configuration file is read upon receiving a request to start the web application. The runtime services for the web application are initialized based on the configuration information read from the configuration file.

In another implementation, unmanaged objects associated with Web applications are automatically expunged from memory. A request to process a Web page containing unmanaged objects operating on a Web server is received. A reference pointer is assigned to the unmanaged object and the reference pointer is stored in a data structure. The unmanaged object is stored in memory. When a notification is received that the web page containing the unmanaged object is no longer being processed the reference pointer is used to locate the unmanaged object from memory. Once located, the unmanaged object is then removed from memory.

In another implementation, programmable misuse of configuration information associated with objects is prevented. A dependency database is maintained describing dependencies associated with modules used by an application. Information entered by a programmer describing how the programmer desires to use the modules in an application is received. A check is made whether the information entered by the programmer matches the dependencies associated with the modules maintained in the database. If the entered information does not match the dependencies, then an error exception notification is enabled.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Overview

To overcome inefficiencies and problems described in the Background section, the following description introduces the broad concept of providing an extensible programming framework that streamlines building of Web applications. This is accomplished through several different implementations. In one implementation, an application run time and configuration file (catalogue) stores information that enables a developer to configure and initialize applications, eliminating most initialization coding for objects. In another implementation, a run time disposal system removes objects from memory including those objects across disparate systems. And in another implementation, the runtime permits dependencies between systems (or objects) to be mapped to prevent a developer from rendering an application into an unstable state.

Various application program interfaces (APIs) for a network platform upon which developers can build Web applications and services are described herein. In the exemplary implementation the NET platform created by Microsoft Corporation is described. The .NET platform is a software platform for Web services and Web applications implemented in the distributed computing environment.

In the described implementation, the .NET platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, XML defines what those elements contain. HTML uses predefined tags, but XML allows tags to be defined by the developer (also referred to as the "programmer") of the page. Thus, virtually any data items can be identified, allowing Web pages to function like database records. Through the use of XML and other open protocols, such as Simple Object Access Protocol (SOAP), the .NET platform allows integration of a wide range of services that can be tailored to the needs of the user. Although the embodiments described herein are described in conjunction with XML and other open standards, such are not required for the operation of the claimed invention. Other equally viable technologies will suffice to implement the inventions described herein.

As used herein, the phrase application program interface or API includes traditional interfaces that employ method or function calls, as well as remote calls is (e.g., a proxy, stub relationship) and SOAP/XML invocations.

Exemplary Network Environment

Figure 1:
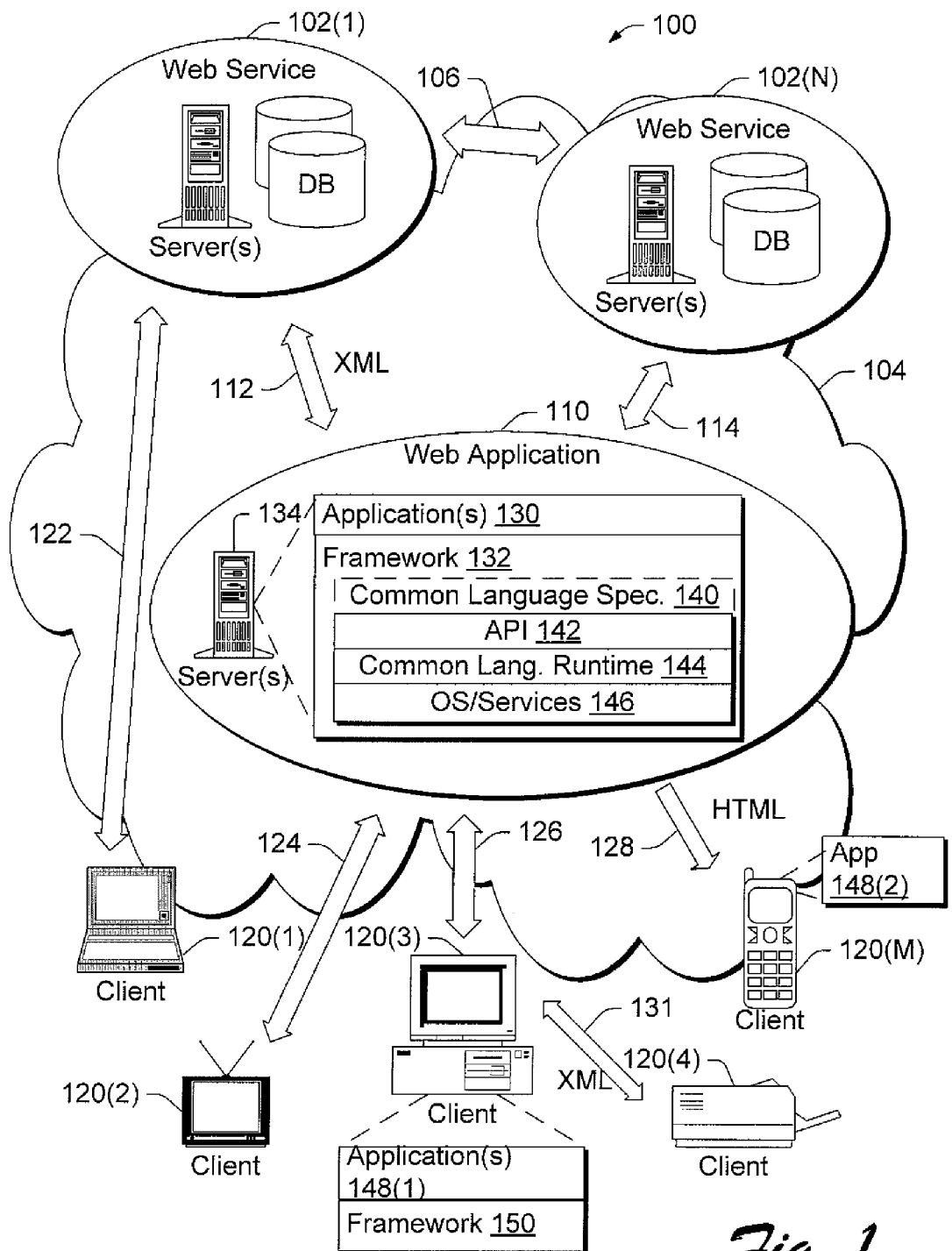
FIG. 1 shows a network environment 100 in which a network platform, such as the .NET platform, may be implemented.

FIG. 1 shows a network environment 100 in which a network platform, such as the NET platform, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering of messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communicate with one another using standard protocols as well, as represented by an exemplary XML link 131 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing requests from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/ TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex inter-workings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely from the servers 134 that host the framework. Representative applications 148(1) and 148(2) residing on clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
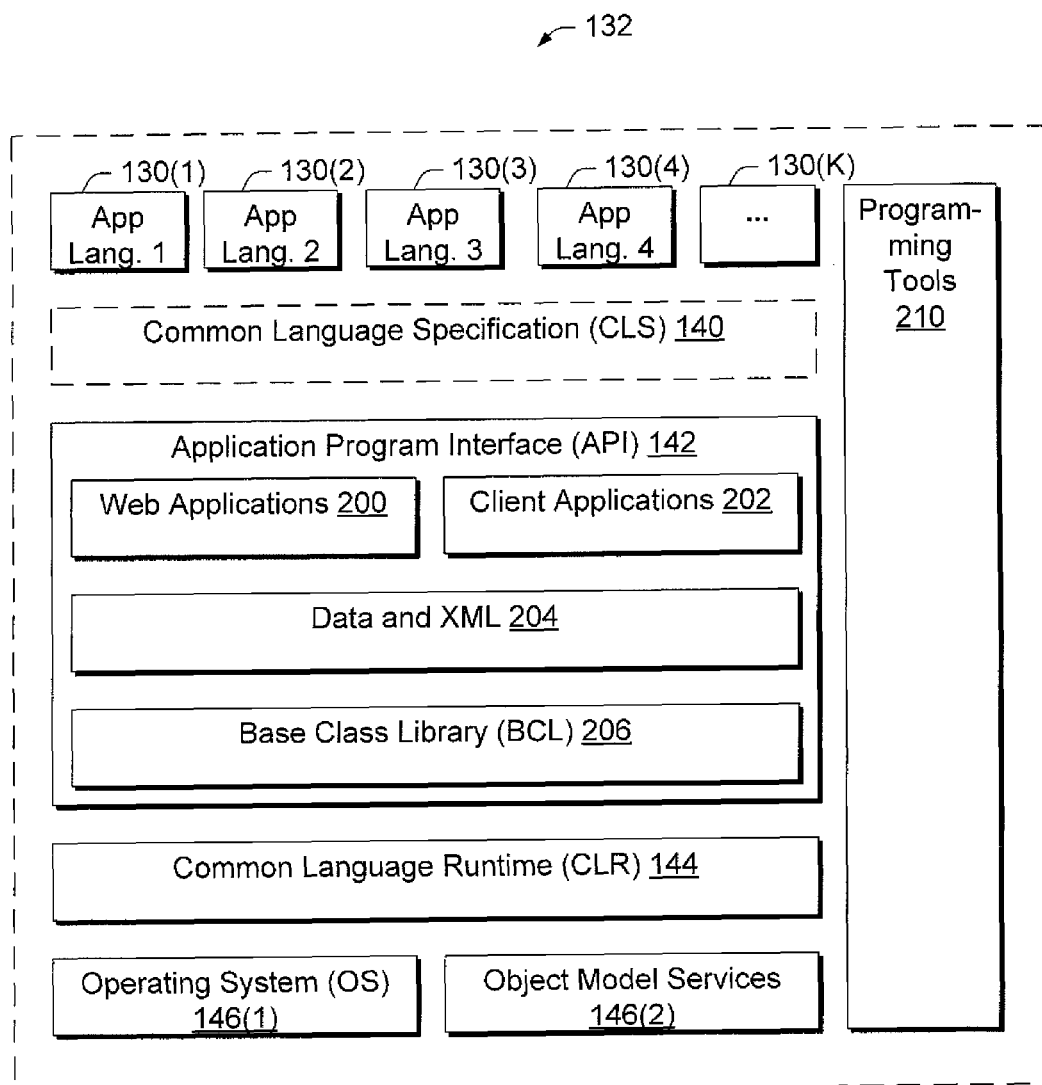
FIG. 2 shows a programming framework in more detail.

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic®, C++, C4, COBOL, JSCRIPT®, PERL®, EIFFEL®, PYTHON®, and so on. The common language specification 140 specifies a subset of features or rules about features that, if followed, allow the various languages to communicate. For example, some languages do not support a given type (e.g., an "int*" type) that might otherwise be supported by the common language runtime 144. In this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use that code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598,105, now U.S. Pat. No. 6,836,883) and "Unified Data Type System and Method" filed Jul. 10, 2000 (Ser. No. 09/613,289, abandoned), which are incorporated by reference.

The framework 132 encapsulates the operating system 146(1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized into four root namespaces: a first namespace 200 for Web applications, a second namespace 202 for client applications, a third namespace 204 for data and XML, and a fourth namespace 206 for base class libraries (BCL). Each group can then be assigned a name. For instance, types in the Web applications namespace 200 are assigned the name "Web", and types in the data and XML namespace 204 can be assigned names "Data" and "XML" respectively. The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the Web applications namespace 200 can be referenced using the hierarchical name "System.Web". In this way, the individual namespaces 200, 202, 204, and 206 become major branches off of the System namespace and can carry a designation where the individual namespaces are prefixed with a designator, such as a "System." prefix.

The Web applications namespace 200 pertains to Web based functionality, such as dynamically generated Web pages (e.g., Microsoft's Active Server Pages (ASP)). It supplies types that enable browser/server communication. The client applications namespace 202 pertains to drawing and client side UI functionality. It supplies types that enable drawing of two-dimensional (2D), imaging, and printing, as well as the ability to construct window forms, menus, boxes, and so on.

The data and XML namespace 204 relates to connectivity to data sources and XML functionality. It supplies classes, interfaces, delegates, and enumerations that enable security, specify data types, and serialize objects into XML format documents or streams. The base class libraries (BCL) namespace 206 pertains to basic system and runtime functionality. It contains the fundamental types and base classes that define commonly-used value and reference data types, events and event handlers, interfaces, attributes, and processing exceptions.

In addition to the framework 132, programming tools 210 are provided to assist the developer in building Web services and/or applications. One example of the programming tools 200 is Visual Studio™, a multi-language suite of programming tools offered by Microsoft Corporation.

Configuration and Initialization Services

Figure 3:
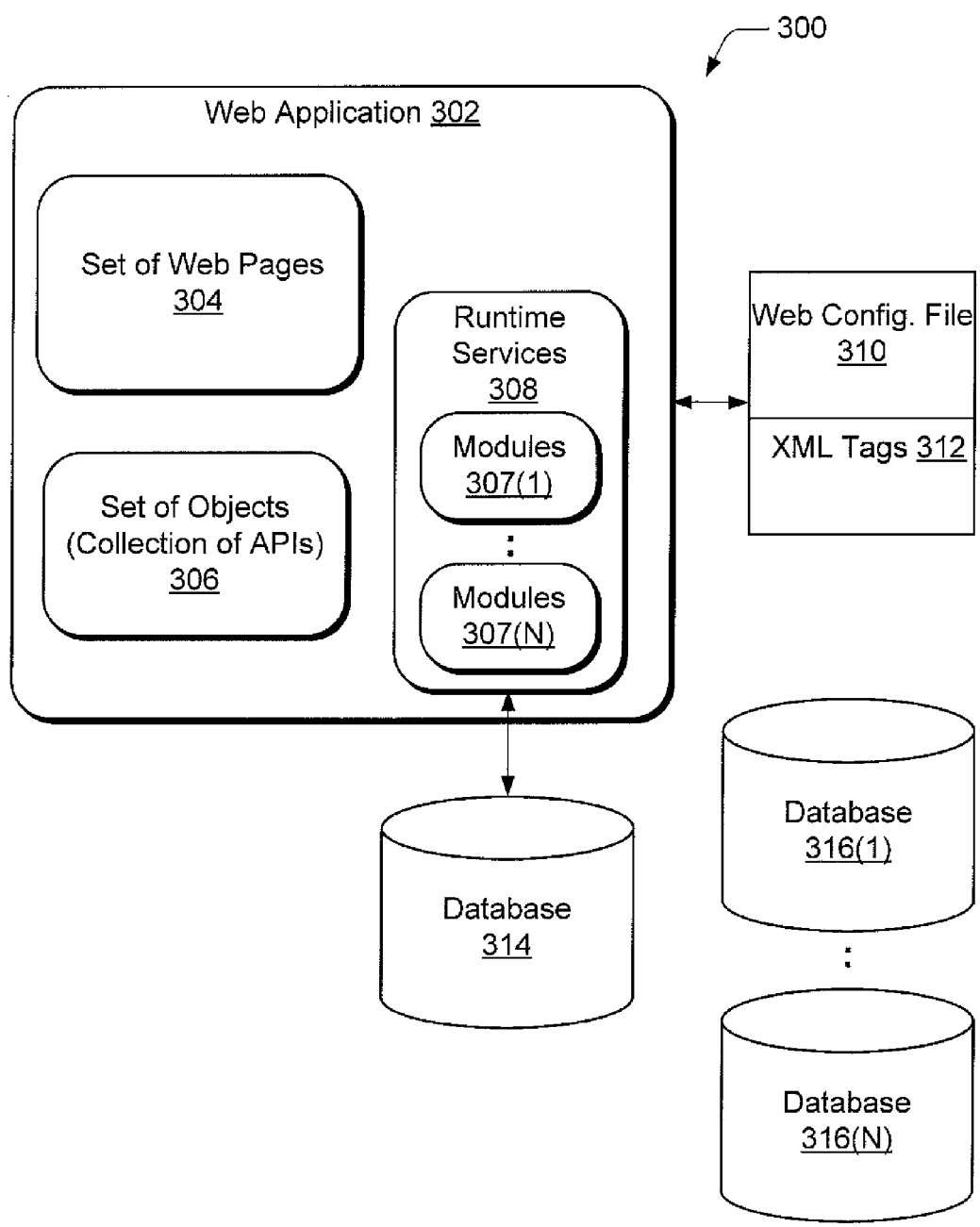
FIG. 3 shows an exemplary system for assisting developers in initializing and configuring a Web application.

FIG. 3 shows an exemplary system 300 for assisting developers in initializing and configuring a Web application 302. The exemplary Web application 302 may include e-commerce business applications and services. For instance, a service that permits customers to purchase items from a Web site may be one example of a type of Web application 302 used in system 300. Additionally, other Web applications 110 such as those described above with reference to FIGS. 1 and 2 could be represented by Web application 302.

Web application 302 includes a set of Web pages 304. The set of Web pages are linked together allowing a visitor to move from one page another through a Web browser (not shown) on client devices 120 (see FIG. 1). ASP.NET allows those pages to be accessed by the Web browser. The arrangement of pages constitutes a part of a Web site's topology. A page or a set of pages can contain or point to a variety of resources, including images, text, scripts, links to resources and so forth. A user may perform "actions" while on a page of the Web site by "clicking" on a designated location and being linked to a desired location or cause an event to occur. For example, an action may include clicking on and/or interacting with an advertisement, traversing from one page to another, purchasing an item, adding an item to a virtual shopping basket, etc.

Each time a user performs an action on a page, the action calls one or more objects 306 representing a collection of APIs that permit the actions to occur, which is sometimes referred to as the "runtime" behavior of a Web site. In order to place the Web application 302 into a state that can be used by a customer, the application's 302 runtime services 308 must be configured and initialized. Run time services 308 include modules 307(1), . . . , 307(N), (referenced generally as number 307) that provide the capability for a developer to configure and initialize the application 302.

The developer uses the runtime services 308 to create a web configuration file 310 by inserting configuration information that are necessary to configure the run time services 308 and the operational behavior of the set of objects 306. Typically, a developer initially opens a text editor (not shown) such as a notepad, types in tags (such as XML tags 312) pertaining to the configuration, and saves the configuration information in the configuration file 310. For instance, using the editor the developer will typically load tags into a Web configuration file 310. Each tag generally references some type of runtime configuration information necessary for the Web application 302. That is, the tags provide a means for retrieving configuration information from various sources for configuring the Web application 302. For example, configuration information can be retrieved from a data source using an SQL query to retrieve the configuration information from the source. The tags in the exemplary implementation take the form of XML tags 312, but could utilize other tagging technologies capable of referencing information. Database 314 stores low level configuration information for the run time services 308 such as pointers to one or more other databases 316(1), . . . , 316(N).

Once the Web configuration file 310 is created, it can be utilized by Web application 302. For example, Web application 302 starts-up because a user from a client device 120 browses to the Web site containing Web application 302. At the first occurrence of a user requested page from application 302, application 302 starts up (i.e., is loaded into memory of a server). Then, ASP.NET instance (through the collection of APIs 306) calls out to the runtime service 308 based on information in Web configuration file 310, which are initially read from the Web configuration file 310. Accordingly, the runtime services 308 are activated as part of the application 302. Once activated, the runtime services 308 reads configuration information specific to the application 302 from the Web configuration file 310. Based on the configuration information read from the configuration file, Web application 302 is initialized (i.e., put into a state to be used by the Web application 302 to perform operations). Thus, Web application 302 through it framework (i.e., 132 in FIG. 1) is able to determine which modules need to be created and initialized based on information read from the configuration file 310.

Figure 4:
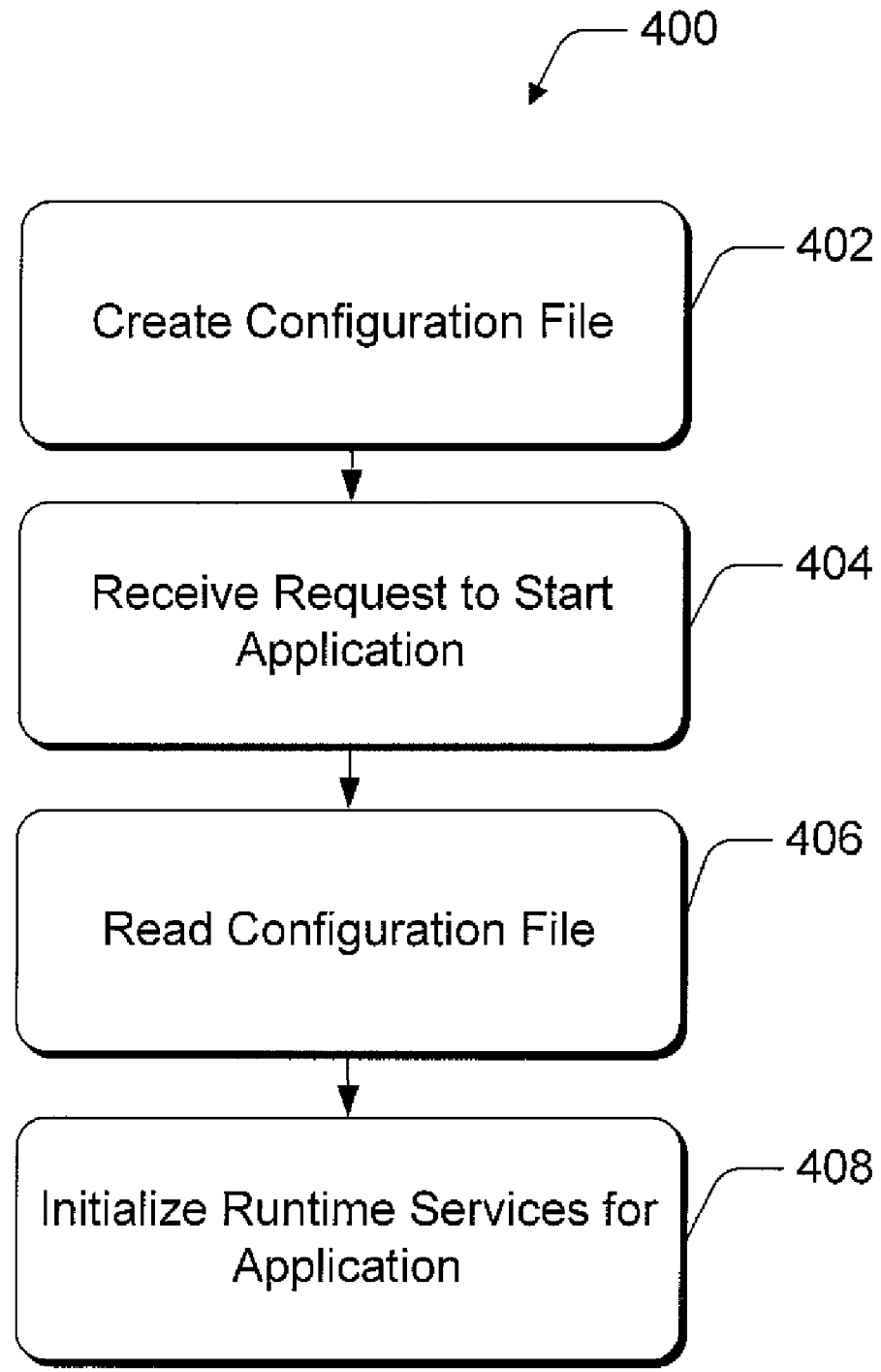
FIG. 4 is a flow chart illustrating an exemplary method for configuring and initializing runtime services for a Web application.

FIG. 4 is a flow chart illustrating an exemplary method 400 for configuring and initializing runtime services for a Web application. Method 400 includes blocks 402-408. The order in which the method is described is not intended to be construed as a limitation. Additionally, portions of the operations may be optional, performed intermittently, or performed simultaneously. Furthermore, the method 400 can be implemented in any suitable hardware, software, firmware, or combination thereof.

At block 402 a configuration file 310 is created for Web application 302. Typically, the objects 306 created for the application by a developer requires configuration information in order to initially execute an action request performed on a page from the set of web of pages 304. Accordingly, the developer uses tags (e.g., XML tags 312) to provide configuration information specific to the operation behavior of the Web application 302.

At block 404, a request is received to start the application 302. The configuration file 310 is loaded into memory. At block 406 the configuration file 310 is read to determine which runtime services 308 are used in the application 302. That is, ASP.NET reads the configuration file 310 and determines which run time services 308 to invoke. The runtime services contains one or modules containing resources necessary for the application 302 to operate. The runtime services 308 can include application services or page services. "Application services" includes services and data common to the entire application 302 (such as profiles systems and catalog systems) and are globally available to user sessions. "Page services" includes services and data common to an individual page, accessed within the scope of a user's request to Web site running the Web application 302, such as the current user's profile.

At block 408, based on the configuration information read from the configuration file 310 the runtime services 308 are initialized for the application 302. Thus, method 400 provides automatic initialization of the Web application 302 and removes the onus on the site developer for creating and manually configuring the set of objects (e.g., runtime objects) 306.

Automatic Disposal of Unmanaged Resources

Figure 5:
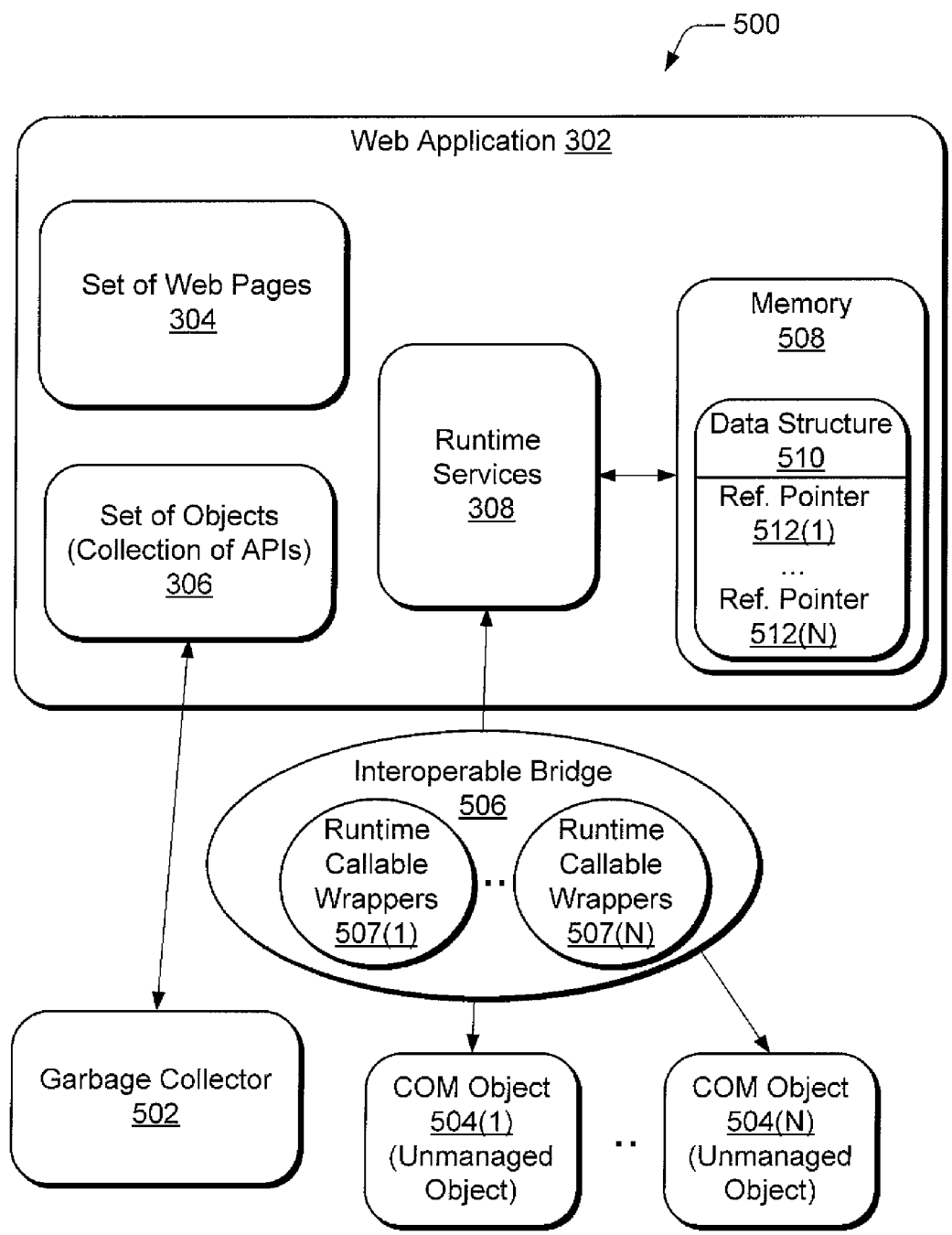
FIG. 5 shows a system that releases unmanaged objects from memory.

FIG. 5 shows a system 500 that releases unmanaged objects from memory. The system 500 shows similar components that were described above with reference to FIG. 3, such as a Web application 302 set of Web pages 304, objects 306, run time services 308. System 500 includes some additional elements that are part of the Framework 132 and/or Web application 302 including a garbage collector 502, one or more component object model (COM) objects 504(1), . . . , 504(N) (referenced generally as COM object 504), an interoperable bridge 506, memory 508 and a data structure 510.

Garbage collector 502 manages the allocation and release of data from memory 508. Each time an object is created, runtime services 308 allocates space for the objects in memory 508. Because memory 508 is limited, garbage collector 502 performs a collection to free memory. Typically, this is accomplished by checking for objects that are no longer being used by the application 302 and to perform the necessary operations to release the memory used by these objects.

Runtime services 308 also allocates space for objects in memory 508 that are not managed by the garbage collector 502. These objects are referred to as "unmanaged objects" because they represent references that are not native to the .NET framework. Runtime services 308 are able to access objects that are not native to the .NET framework through interoperable bridge 506, which uses the CLR 144 (FIG. 1) to assemble the objects in runtime callable wrapper assemblies 507(1), . . . , 507(N) (referenced generally as number 507). These assemblies 507 contain metadata which describes the objects stored in each of the assemblies. For example, in one implementation COM objects 504 can be accessed by run time services 308 through the interoperable bridge 506 and loaded into memory 508. It is possible that other unmanaged objects may be handled by the system 500.

One problem arises when attempting to release space from memory 508 involving objects that are not managed by the garbage collector 502, because these objects are pulled from a resource that utilizes technologies that are not native to the .NET framework. The garbage collector 502 knows that unmanaged objects exist but is unable to automatically purge memory of unmanaged objects (such as COM objects 504) in a timely manner, because the garbage collector 502 does not know what data is contained in the runtime callable wrapper assemblies 507 and therefore doesn't know when data contained in the assemblies is no longer being utilized by the Web application 302.

Typically, an unmanaged object is stored in memory 508 after being requested by Web application 302. The unmanaged object will remain in memory beyond the completion of the request. To address this problem, runtime services 308 assigns reference pointers 512(1), . . . , 512(N), to unmanaged objects received from the interoperable bridge 506 that are requested by Web application 302. Each reference pointer, referenced generally as number 512, is assigned when the request is made for the unmanaged object. Each reference pointer 512 is then stored in a data structure 510 (e.g., a list) maintained in memory 508. Each reference pointer 512 points to a location in memory 508 in which a corresponding unmanaged object is stored. Web application 302 sends a notification to run time services 308 when Web application 302 completes a request. When run time services 308 receives the notification, each reference pointer 512 along with its unmanaged object, pertaining to the request, is forcibly expunged from memory 508.

Figure 6:
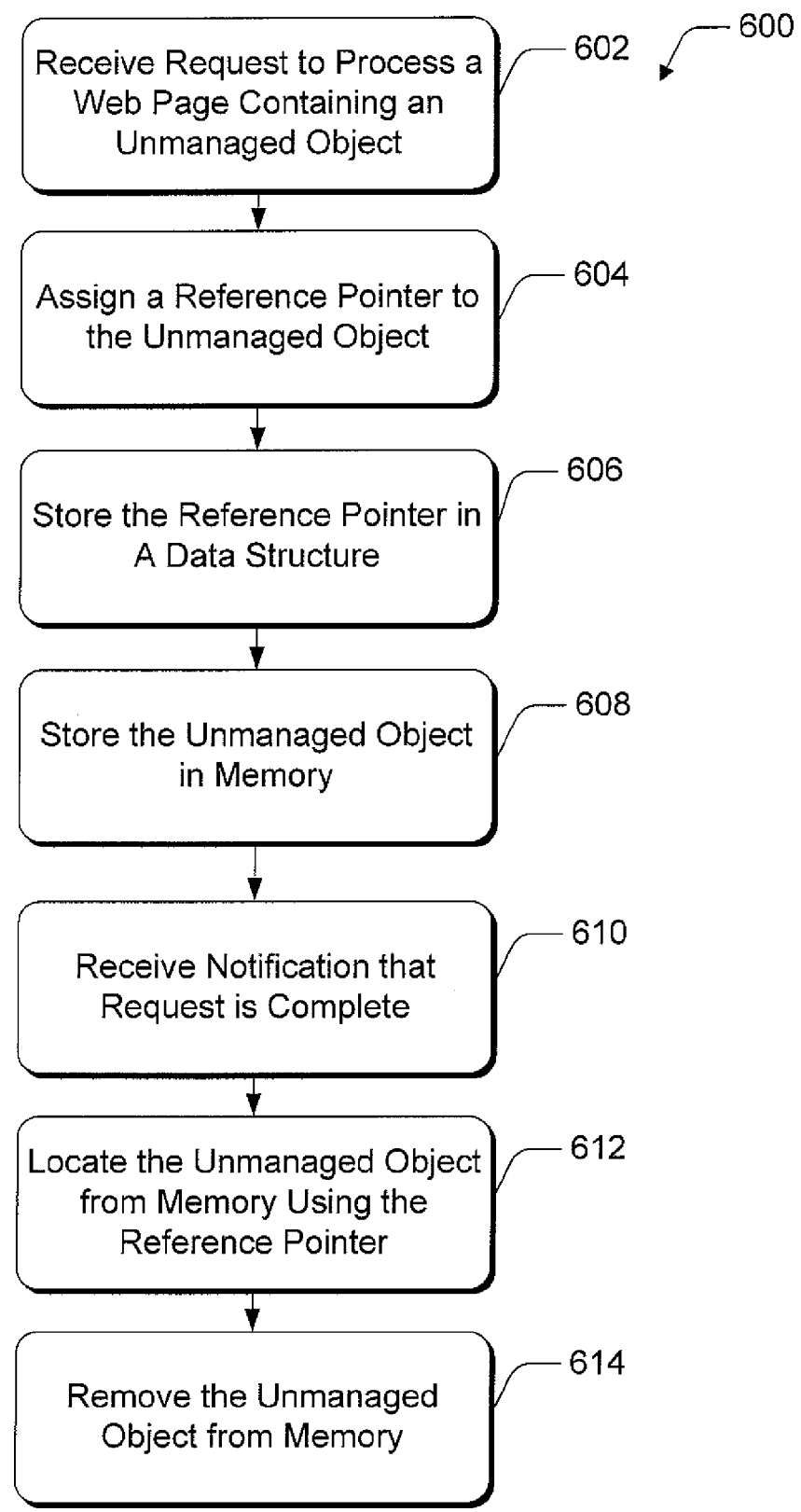
FIG. 6 is a flow chart illustrating an exemplary method for expunging unmanaged objects from memory.

FIG. 6 is a flow chart illustrating an exemplary method 600 for expunging unmanaged objects from memory. Method 600 includes blocks 602-614. The order in which the method is described is not intended to be construed as a limitation. Additionally, portions of the operations may be optional, performed intermittently, or performed simultaneously. Furthermore, the method 600 can be implemented in any suitable hardware, software, firmware, or combination thereof.

At block 602, a request is received to process a Web page containing one or more unmanaged objects. For example, one or more unmanaged objects (e.g., COM objects 504) may be requested for the Web page.

At block 604, one or more reference pointers 512 are assigned to the unmanaged object(s). At block 606, each reference pointer is stored. For example each reference pointer 512 is stored in data structure 510 maintained in memory 508. The reference pointer uniquely identifies the unmanaged object it is assigned to reference. At block 608, the unmanaged object(s) are stored in memory 508.

At block 610, a notification is received indicating that the request for the page containing the unmanaged object(s) is complete. For example, Web application 302 makes the notification to the runtime services 308.

At block 612, any unmanaged object(s) associated with completed page that are stored in memory 508 are located by using the reference pointer(s) 512. That is, each reference pointer 512 stored in data structure 510 maintained for this page is examined to determine what unmanaged objects should be removed from memory and their locations in memory. At block 614, based on the reference pointers 512, system 500 is able to locate and forcibly remove from memory any unmanaged objects maintained in data structure 510 associated with a particular completed request.

Dependency Management

Figure 7:
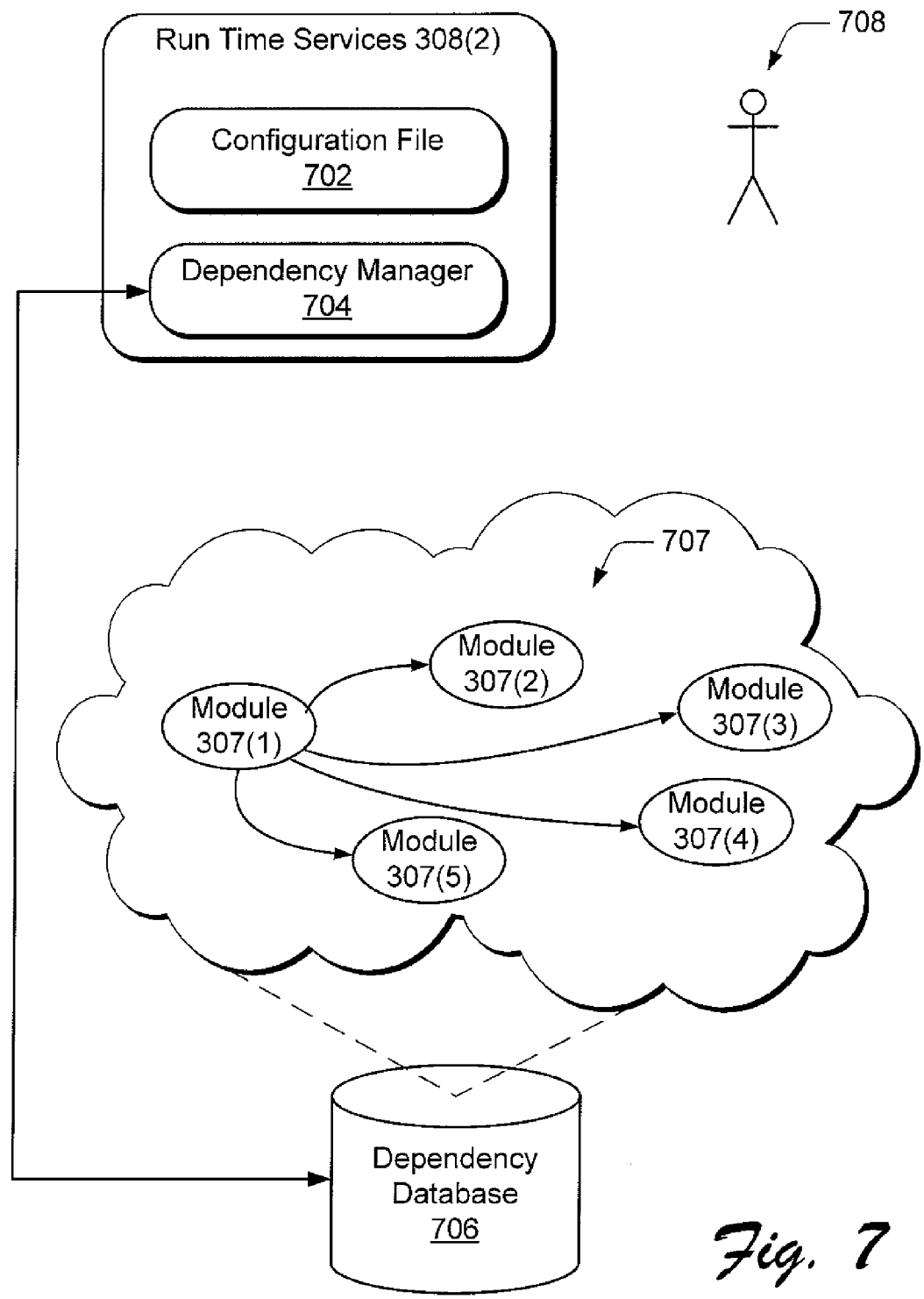
FIG. 7 shows another feature associated with runtime services for managing dependencies between configuration information associated with programmable components.

FIG. 7 shows another feature associated with runtime services 308 for managing dependencies between configuration information associated with programmable components. Runtime services 308 may utilize one of the programming tools 210 shown in FIG. 2 and may part of the framework 132 (see FIG. 1).

Runtime services 308 through programming tools 210 permits a programmer 708 (such as a Web site developer) to configure various programmable components associated with their particular Web application 110. Typically, the programmer 708 uses a configuration file 702 (such as Web configuration file 310 shown in FIG. 3) to configure the various programmable components, such as, for example specifying a site name, joining data, specifying a redirecting URL, providing a cache name attribute, and indicating an event pipeline. The aforementioned examples are only a few of many other various attributes that can be configured depending on the Web application. Unfortunately, programmers inevitably make mistakes, either in misusing objects, in omissions, or in incorrectly configuring a particular component.

Dependency manager 704 maintains a dependency database 706 describing dependencies associated with modules (i.e., programmable components) used by an application such as a Web application 110. For example, referring to FIG. 7, Module 307(1) shows dependencies on Modules 307(2), 307(3), 307(4), and 307(5). In order for Module 307(1) to operate correctly, Modules 307(2), 307(3), 307(4), and 307(5) should be available for Module 307(1) to access or some type of error may occur that may cause the Web application 110 to fail. Dependency manager 704 checks dependency database 706 to make sure that such dependencies (e.g., Module A depends on Modules B, C, D and E) are adhered to when the application starts up.

If the programmer 708 makes an error in configuring a module, then dependency manager 704 will issue some type of error exception notification to the programmer 708 after checking the dependency database 706. The error exception may inform the programmer 708 of the exact error the programmer made. For example, if the programmer 708 deletes Module 307(5), dependency manager 704 may issue an error exception notification indicating that Module 307(1) may fail because Module 307(1) depends on Module (5).

The dependency database 706 is initially coded by a developer of the Modules 307. The developer (not shown) enters the dependencies and their correct orders (e.g., Module 307(1) depends on Modules 307(2), 307(3), 307(4), and 307(5)). It is also possible that programmer 708 (e.g., builder of Web application 302) could have permission to enter specific dependencies in the capacity of a developer and/or the developer and programmer 708 could be the same entity.

Figure 8:
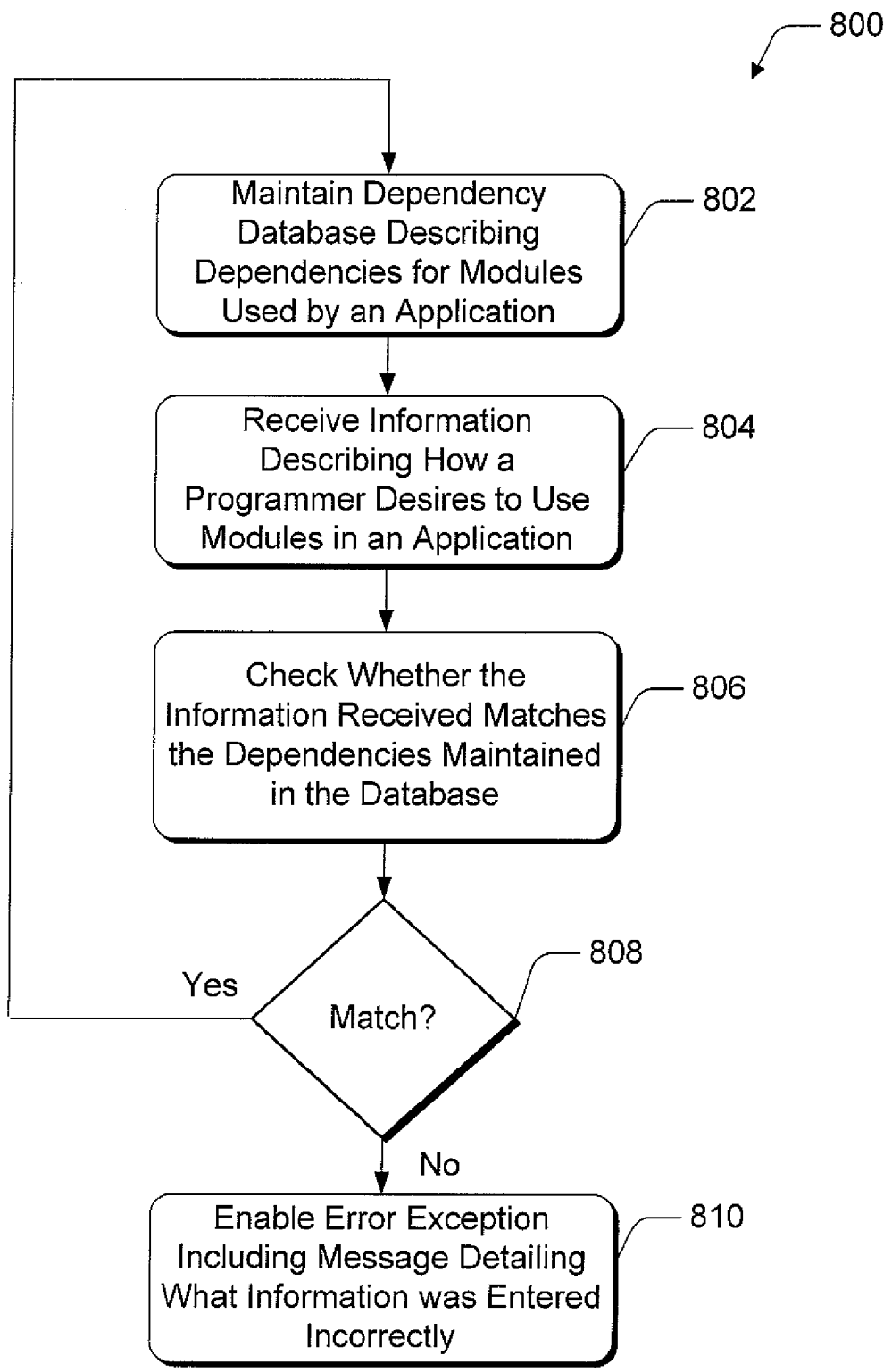
FIG. 8 is a flow chart illustrating an exemplary method for preventing programmable misuse of modules such as the grouping shown in FIG. 7.

FIG. 8 is a flow chart illustrating an exemplary method 800 for preventing programmable misuse of modules such as the grouping shown in FIG. 7. Method 800 includes blocks 802-810. The order in which the method is described is not intended to be construed as a limitation. Additionally, portions of the operations may be optional, performed intermittently, or performed simultaneously. Furthermore, the method 800 can be implemented in any suitable hardware, software, firmware, or combination thereof.

At block 802, a dependency database 706 is maintained containing information describing dependencies associated with modules used by an application. For example, programming tool 700 through its dependency manager 704 maintains the database 706. Typically, the database is initially configured by a developer of one or modules, but it is possible that other entities may have the ability and/or permission to configure the database in certain circumstances.

At block 804, information is received from a programmer 708 (e.g., such as a Web site developer) describing how the programmer desires to use certain modules in an application. For example, the programmer 708, through the programming tool 700 may use the configuration file to configure an object.

At block 806, the information entered by the programmer is compared to the information maintained in the database describing the dependencies. For example, the dependency manager 704 checks whether the information entered by the programmer 708 "matches" the dependencies (dependency information 707) associated with the modules maintained in the database 706+"Matches" as used herein does not necessarily mean that information entered by the programmer has to be exactly the same as the dependency information 707, so long as the information entered and the dependency information 707 is consistent with each other.

At decisional block 808 a decision is made whether the information was entered matches the database or not. If the information entered matches, then according to the YES branch of decisional block 808 method 800 proceeds to check whether any additional information entered by the programmer 708 is correct. If the information entered does not match the dependencies (dependency information 707) maintained in the database, then according to NO branch of block 808 method 800 proceeds to block 810.

According to block 810, an error exception notification is displayed to the programmer 708, if the information entered by the programmer is incorrect (i.e., it does not match the dependency requirements maintained in the database 706). The error notification may detail what information entered by the programmer failed to match the dependency requirements.

Exemplary Computing System and Environment

Figure 9:
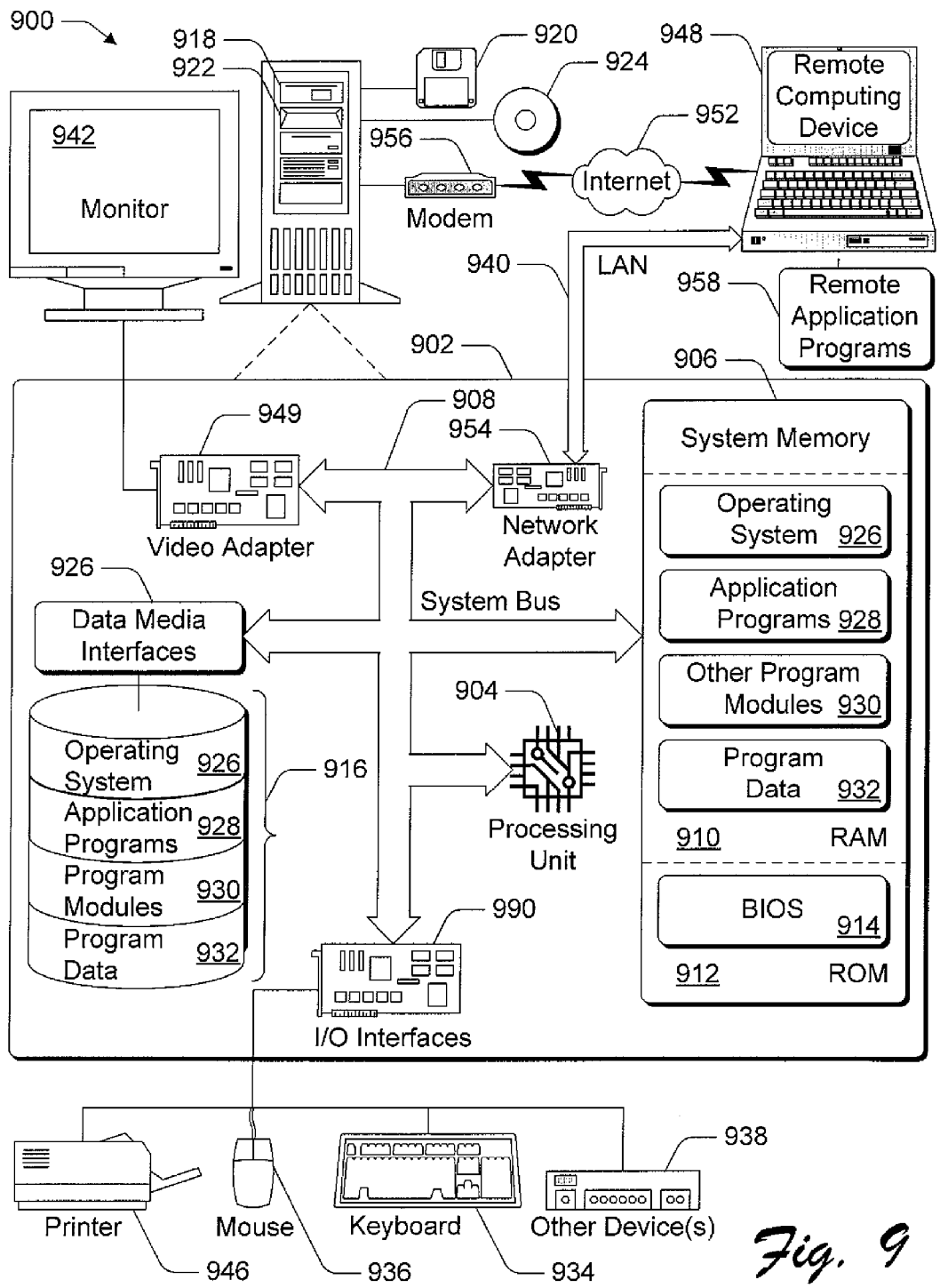
FIG. 9 illustrates an example of a computing environment within which the applications including the runtime services, platforms, framework, systems, modules and methods described herein can be either fully or partially implemented.

FIG. 9 illustrates an example of a computing environment 900 within which the applications 130 including the runtime services, platforms, framework, systems, modules and methods described herein can be either fully or partially implemented. Exemplary computing environment 900 is only one example of a computing system and is not intended to suggest any limitation as to the scope of use or functionality of the network architectures. Neither should the computing environment 900 be interpreted as having any dependency or requirement relating to any one or combination of components illustrated in the exemplary computing environment 900.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The runtime services, systems, platform, framework, modules, and methods described herein may be described in the general context of computer-executable instructions, such as program modules, being executed by a computer. Generally, program modules include routines, programs, objects, components, data structures, etc. that perform particular tasks or implement particular abstract data types. The applications 130 (including the runtime services, systems, platform, framework, modules, and methods described herein) may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing system in the form of a computer 902. The components of computer 902 can include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 902 typically includes a variety of computer readable media. Such media can be any available media that is accessible by computer 902 and includes both volatile and non-volatile media, removable and non-removable media. The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 can also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 416, magnetic disk drive 918, and optical disk drive 922 are each connected to the system bus 908 by one or more data media interfaces 926. Alternatively, the hard disk drive 916, magnetic disk drive 918, and optical disk drive 922 can be connected to the system bus 908 by a SCSI interface (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of the applications 130 (including the runtime services, platforms, framework, systems, modules and methods described herein).

Computer system 902 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, a portable computer, a server, a router, a network computer, a peer device or other common network node, and the like. The remote computing device 948 is illustrated as a portable computer that can include many or all of the elements and features described herein relative to computer system 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet. When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components, such as the operating system, are illustrated herein as discrete blocks, although it is recognized that such programs and components reside at various times in different storage components of the computer system 902, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
   maintaining, by a processor, a dependency database describing dependencies associated with modules used by an application;
   receiving, by the processor, module dependencies entered by a programmer describing how the programmer desires to use the modules in the application;
   checking, by the processor, whether the module dependencies entered by the programmer match the dependencies associated with the modules maintained in the database;
   upon determining that the module dependencies entered by the programmer match the dependencies maintained in the database, checking whether additional information entered by the programmer is correct; and
   upon determining that the module dependencies entered by the programmer do not match the dependencies maintained in the database, enabling an error notification.

2. The method as recited in claim 1, further comprising specifying a message for the error exception notification detailing what module dependencies entered by the programmer fails to match the dependencies maintained in the database.

3. The method as recited in claim 1, wherein the dependency database further describes a correct order for dependencies associated with the modules used by the application.

4. A computer storage medium having computer-executable instructions stored thereon that, when executed by a computer, direct the computer to perform operations comprising:
- maintaining a dependency database describing dependencies associated with modules used by an application;
- receiving module dependencies entered by a programmer describing how the programmer desires to use the modules in the application;
- checking whether the module dependencies entered by the programmer match a correct order for dependencies associated with the modules maintained in the database; and
- enabling an error exception notification, if the entered information does not match a correct order for the dependencies.

5. A computer storage medium as recited in claim 4, further comprising computer-executable instructions that, when executed by a computer, direct the computer to specify a message for the error exception notification detailing one or more module dependencies entered by the programmer that fail to match the correct order for the dependencies.

6. A computer storage medium as recited in claim 4, wherein the dependency database further describes the correct order for the dependencies associated with modules used by the application.

7. A computer storage medium as recited in claim 4, further comprising, when a determination is made that the module dependencies entered by the programmer match the correct order for dependencies maintained in the database, checking whether additional information entered by the programmer is correct.

8. A computing device comprising:
- a processor; and
- a memory coupled to the processor, the memory comprising instructions executable by the processor for:
    - maintaining a dependency database describing dependencies associated with modules used by an application;
    - receiving module dependencies entered by a programmer describing how the programmer desires to use the modules in the application;
    - checking whether the module dependencies entered by the programmer match a correct order for dependencies maintained in the database; and
    - enabling an error exception notification, when the entered information does not match the correct order for the dependencies.

9. The computing device as recited in claim 8, further comprising specifying a message for the error exception notification detailing one or more module dependencies entered by the programmer that fail to match the dependencies maintained in the database.

10. The computing device as recited in claim 8, wherein the dependency database further describes the correct order for the dependencies associated with the modules used by the application.

11. The computing device as recited in claim 8, further comprising, when a determination is made that the module dependencies entered by the programmer match the correct order for dependencies maintained in the database, checking whether additional information entered by the programmer is correct.

* * * * *